United States Patent [19]

Wang

[11] Patent Number: 4,692,636
[45] Date of Patent: Sep. 8, 1987

[54] PYRILIUM DYE NONLINEAR OPTICAL ELEMENTS

[75] Inventor: Ying Wang, Wilmington, Del.

[73] Assignee: E. I. Du Pont de Nemours and Company, Wilmington, Del.

[21] Appl. No.: 797,027

[22] Filed: Nov. 12, 1985

[51] Int. Cl.⁴ .................................................. H03F 7/00
[52] U.S. Cl. .................................... 307/427; 252/586
[58] Field of Search ......... 307/427; 252/582, 585–587

[56] References Cited

U.S. PATENT DOCUMENTS

| | | | |
|---|---|---|---|
| 3,533,787 | 7/1967 | Merrill et al. | 96/1.5 |
| 3,615,414 | 4/1969 | Light | 96/1.6 |
| 3,615,418 | 6/1969 | Staudenmayer et al. | 96/1.6 |
| 3,706,554 | 3/1971 | Fox et al. | 96/1.6 |
| 4,513,071 | 4/1985 | Mey | 430/19 |

OTHER PUBLICATIONS

Nonlinear Optical Properties of Organic and Polymeric Materials, (American Chemical Society, 1983).

*Primary Examiner*—Bruce Y. Arnold

[57] ABSTRACT

Multiphase heterogeneous compositions containing polymeric material and pyrilium dye are illuminated by coherent optical light to generate second harmonic radiation. The compositions comprise a continuous phase of the polymeric material having therein a discontinuous phase comprising the pyrilium dye present in an aggregated ordered form.

18 Claims, 1 Drawing Figure

PYRILIUM DYE NONLINEAR OPTICAL ELEMENTS

BACKGROUND OF THE INVENTION

1. Field of the Invention

The present invention relates to nonlinear optical systems, and particularly to compositions capable of second harmonic generation.

2. Background of the Invention

The high light intensities available in coherent laser radiation have led to the development of nonlinear optical systems. The optical properties of materials are different at high intensities, since the electronic oscillators are driven so hard that anharmonic properties become evident. One such effect is harmonic generation of light, for example, conversion of red laser light to ultraviolet radiation of exactly doubled frequency. This effect, known as second harmonic generation, was first observed when quartz crystals were illuminated by laser radiation. Since this discovery, a number of inorganic and organic materials capable of second harmonic generation (SHG) have been discovered. A useful review of the state of the art relating to nonlinear properties of organic materials is provided by Williams, ed., *Nonlinear Optical Properties of Organic and Polymeric Materials*, (American Chemical Society, 1983).

It has been found that a multiphase heterogeneous composition containing polymeric material and pyrilium dye can be used to control bulk nonlinear optical properties. The composition exhibits large nonlinear polarizability, self-dipolar alignment and second order nonlinear optical properties in thin film form. Second order nonlinear optical properties of the composition include second harmonic generation, sum and difference frequency mixing, and electrooptical effects.

U.S. Pat. No. 3,615,414 issued to Light discloses a multiphase heterogeneous composition formed from an organic dye and electrically insulating polymeric material. A solution of dye and polymer is exposed to a solvent to form heterogeneous compositions. The compositions are said to be useful as photoconductors or electrophotosensitizers and are characterized by a radiation adsorption maximum that is substantially shifted from the adsorption maximum of the dye dissolved in the polymer to form a homogeneous composition. Particularly useful dyes are said to be pyrilium dyes.

SUMMARY OF THE INVENTION

The present invention provides a nonlinear optical device comprising a nonlinear optical element and a source of coherent optical radiation. The nonlinear optical element comprises pyrilium dye and polymeric material having an alkylidene diarylene moiety in the recurring unit. The nonlinear optical element is in the fom of a multiphase heterogeneous composition comprising a continuous phase of the polymeric material having therein a discontinuous phase comprising the pyrilium dye present in an aggregated ordered form. The present invention also provides a method of generating second harmonic radiation comprising illuminating the specified nonlinear optical element with a source of coherent optical radiation.

DETAILED DESCRIPTION OF THE INVENTION

Figure 1:
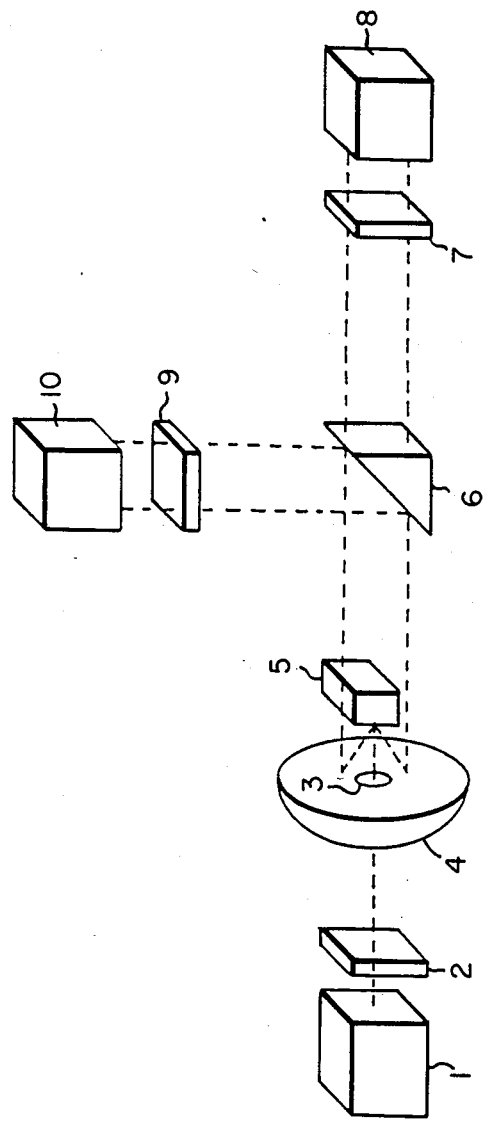
FIG. 1 shows an optical arrangement using the novel device and method to generate and measure second harmonic generation.

The nonlinear optical device of the present invention comprises a nonlinear optical element and a source of coherent optical radiation. The nonlinear element is in the form of a multiphase heterogeneous composition comprising a continuous phase of polymeric material having therein a discontinuous phase comprising pyrilium dye present in an aggregated ordered form. It has been found that the composition can be illuminated with a source of coherent optical radiation to generate second harmonic radiation.

The multiphase heterogeneous composition of the present invention comprises polymeric material and a pyrilium dye. As used herein the expression "polymeric material" refers to a composition comprising polymer and, optionally an electron donor. Suitable polymers for preparing the polymeric material contain an alkylidene diarylene moiety in the recurring unit. Preferably, the polymer is a linear polymer having the following recurring unit:

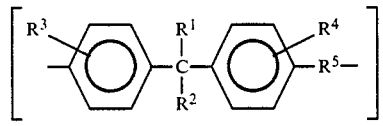

wherein $R^1$ and $R^2$ are individually selected from the group consisting of H, substituted and unsubstituted alkyl radicals having 1 to 10 carbon atoms, and substituted and unsubstituted aryl radicals;

$R^1$ and $R^2$, taken in combination, are a cyclic hydrocarbon radical having a maximum of 18 carbon atoms;

$R^3$ and $R^4$ are individually selected from the group consisting of H, F, Cl, Br, I and alkyl radicals having 1 to 6 carbon atoms; and $R^5$ is a divalent radical selected from the group consisting of

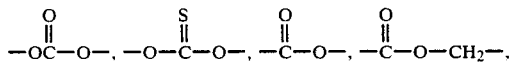

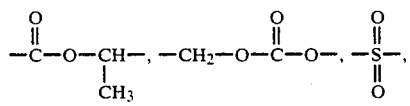

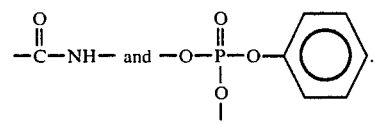

Preferably $R^5$ is

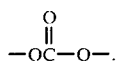

Most preferably, the polymer is a polycarbonate wherein $R^3$ and $R^4$ are H and $R^1$ and $R^2$ are methyl. Such polycarbonates can be prepared with Bisphenol A and can include polymeric products of ester exchange between diphenyl carbonate and Bisphenol A.

Pyrilium dyes preferred for use in preparing the multiphase heterogeneous composition are pyrilium dye salts having the formula:

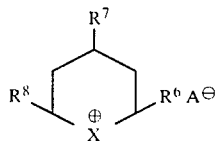

wherein $R^6$ and $R^8$, individually, are phenyl radicals or substituted phenyl radicals having at least one substituent selected from the group consisting of alkyl radicals having 1 to 6 carbon atoms and alkoxy radicals having 1 to 6 carbon atoms; $R^7$ is 4-dimethylaminophenyl; X is selected from the group consisting of NH, O, S, Se and Te; and A is an anion selected from the group consisting of perchlorate, fluoroborate, tetrafluoroborate, hexafluorophosphate, iodide, chloride, bromide, sulfate, periodate, and p-toluenesulfonate. Most preferably, X is S or Se. The amount of dye employed in the composition is not critical. Preferably the amount of dye employed is from about 0.1 to about 10 weight percent based on the polymeric material, and most preferably, about 1 to about 4 weight percent.

Homogeneous compositions of the polymeric material and pyrilium dye can be converted to the heterogeneous compositions by contacting the homogeneous composition with the vapor of a solvent. Preferably the contacting is conducted at ambient temperature. A partial list of suitable solvents includes organic solvents such as benzene, toluene, acetone, 2-butanone; halogenated hydrocarbons such as dichloromethane; and alcohols such as ethanol, methanol, benzyl alcohol, and mixtures thereof. It is believed that these solvents swell the polymer matrix which promotes formation of the dye aggregate.

The size of the aggregated domains of dye in the polymeric material vary from about 0.01 to about 25 μm or less, and preferably, about 0.1 to about 10 μm. A characteristic of the heterogeneous compositions is that they have a maximum radiation absorption wavelength at least about 65 nm longer than the wavelength of maximum absorption of the dye solubilized with the polymeric material in a homogeneous composition.

In one embodiment, the multiphase heterogeneous composition contains an electron donor. A partial list of suitable electron donors includes leuco bases of diaryl- and triarylmethane dyes, 1,1,1-triarylalkanes wherein the alkane moiety has at least two carbon atoms, and tetraarylmethanes, wherein an amine group is substituted on at least one of the aryl groups attached to the alkane and methane moieties. Preferably the electron donor is selected from the group consisting of triarylmethane leuco dyes wherein the aryl groups are unsubstituted phenyl or phenyl substituted with such substituents as alkyl and alkoxy radicals having 1 to 8 carbon atoms, hydroxy and halogen and the amino substituent is a p-dialkylamino group, $-NL_2$, wherein L is an alkyl radical having 1 to 8 carbon atoms.

The nonlinear optical element of the present invention can be employed as a film having a thickness of from about 0.1 to about 30 μm, and preferably, from about 1 to about 10 μm. The element can also be employed as a coating on a substrate. As used herein, "substrate" means any material or synthetic support. Preferred substrates are supports capable of existing in a flexible or rigid film or sheet form. A partial list of materials forming preferred substrates includes glass, oriented polyester film, polyvinylidene chloride-coated oriented polyester film, nylon, polypropylene film, cross-linked polyester-coated paper, a metal sheet or foil, metal alloys, metal oxides, alloy oxides, silicon, silicon oxides, aluminum oxide, and the like. Substrate-coated elements are preferably prepared by solvent coating.

The present invention is further defined by the following examples, wherein all parts and percentages are by weight and degrees are Celsius unless otherwise stated.

Experimental Procedure

Samples prepared for evaluation in the following examples were irradiated by a Nd-YAG laser, using an optical arrangement corresponding to that depicted in FIG. 1. As indicated in FIG. 1, filter 2 was employed to adjust the intensity of the monochromatic signal provided by Nd-YAG laser 1. The resulting beam was directed through a cental hole 3 in parabolic mirror 4, illuminating sample 5. Light emerging from sample 5 was collected by mirror 4, and transmitted to a beam splitter 6, which divided the signal into two parts. One part was passed through a narrow band filter 7, having a full-width half maxima of 10 nm, centered at a second harmonic wavelength to be detected. The signal passing through filter 7 was detected by photomultiplier 8. The other beam provided by beam splitter 6 was directed through a broad band filter 9, having a full-width half maxima of 70 nm, and detected by a second photomultiplier 10. Thus, in each experiment, two channel detection enabled discrimination against potential spurious signals from the sample. Unless otherwise stated, the wavelength of the incident radiation was 1.06 μm.

In each experiment, a polycrystalline urea powder sample having an average thickness of about 250 μm was used as a reference material. The intensity of the second harmonic radiation generated by each sample tested was thus measured relative to that provided by urea.

EXAMPLE 1

In this experiment, 0.048 g 4-(4-dimethylaminophenyl)-2,6-diphenylthiapyrilium tetrafluoroborate (TPD-1), 0.6 g phenyl-bis(4-diethylamino-2-methylphenyl)methane (LG-1), and 1.0 g poly(4,4'-isopropylidenephenyl carbonate) were dissolved in 12.38 mL of a dichloromethane:methanol (90:10 by volume) solvent mixture. The resulting combination was coated onto a glass slide. Evaporation of the solvent mixture at ambient temperature provided a polymer coating having a thickness of about 10 μm on the surface of the glass slide. The polymer coating contained 3% unaggregated TPD-1 dye, $\lambda_{max}$ 565 nm. A portion of the coating was exposed to vapors of dichloromethane at ambient temperature for about 90 seconds which caused the TPD-1 dye to aggregate spontaneously into a thread-like structure, $\lambda_{max}$ 690 nm. The resulting complex of the polymeric material containing the aggregated dye was tested for second harmonic generation. The SHG efficiency measured was comparable to that provided by a urea control.

EXAMPLES 2-3

In these experiments, the procedure employed in Example 1, above, was substantially repeated except that the polymer coatings contained the amount of TPD-1 dye shown in Table I. The resulting polymer coatings were tested for SHG by a procedure substantially similar to that previously described. The results are set forth in Table I.

TABLE I
Second Harmonic Generation by Compositions of TPD-1, LG-1, and Poly(4,4'-Isopropylidenediphenyl Carbonate)

| Example | TPD-1, % | Coating Thickness (μm) | SHG Relative to Urea |
|---|---|---|---|
| 2 | 1.5 | 1 | 0.07 |
| 3 | 1.5 | 5.8 | 0.5 |

The polymer coating prepared in Example 3 was also irradiated at 1.9 82 m from a Raman-shifted YAG laser and the second harmonic signal at 0.95 μm was collected and measured. The coating showed an SHG ratio, relative to urea, of 1.0.

EXAMPLES 4-9

In this series of experiments, the procedure of Example 1 was substantially repeated, except that the tetrafluoroborate salt (TPD-1) of the thiapyrilium dye was replaced with hexafluorophosphate salt (TPD-2). The resulting polymer coatings were tested for SHG and the results are set forth in Table II.

TABLE II
Second Harmonic Generation by Compositions of TPD-2, LG-1, and Poly(4,4'-Isopropylidenediphenyl Carbonate)

| Example | TPD-2 % | Coating Thickness (μm) | SHG Relative to Urea |
|---|---|---|---|
| 4 | 1.5 | 1.2 | 0.2 |
| 5 | 1.5 | 5.8 | 0.7 |
| 6 | 1.5 | 2.5 | 0.36 |
| 7 | 1.5 | 3.1 | 0.61 |
| 8 | 3.0 | 3.3 | 0.58 |
| 9 | 3.0 | 1.1 | 0.38 |

The polymer coatings prepared in Examples 4 and 5 were examined under an optial microscope. The dye aggregates showed a filament-like structure with an estimated dimension of 5×0.5 μm or smaller.

EXAMPLES 10-11

In these experiments, the procedure employed in Examples 4-9 was substantially repeated, except that the polymer coatings contained no LG-1. The results are set forth in Table III.

TABLE III
Second Harmonic Generation by Compositions of TPD-2, and Poly(4,4'-Isopropylidenediphenyl Carbonate)

| Example | TPD-2 % | Coating Thickness (μm) | SHG Relative to Urea |
|---|---|---|---|
| 10 | 1.5 | 0.63 | 0.06 |
| 11 | 1.5 | 2.1 | 0.14 |

EXAMPLE 12

In this experiment, the procedure employed in Example 1 was substantially repeated except that the substrate was oriented polyester film and the thiapyrilium dye (TPD-1) was replaced with 4-(4-dimethylaminophenyl)-2,6-diphenylselenapyrilium perchlorate (SPD-1). The results are set forth in Table IV.

TABLE IV
Second Harmonic Generation by a Composition of SPD-1, LG-1, and Poly(4,4'-Isopropylidenediphenyl Carbonate)

| Example | SPD-1 % | Coating Thickness (μm) | SHG Relative to Urea |
|---|---|---|---|
| 12 | 3.0 | 10 | 0.55 |

The portion of the coating containing aggregated dye was also irradiated at 1.9 μm from a Raman-shifted YAG laser and the second harmonic signal at 0.95 μm was collected and measured. The coating showed an SHG ratio, relative to urea, of 2.5.

What is claimed is:

1. A nonlinear optical device comprising a nonlinear optical element and a source of coherent optical radiation, said nonlinear optical element comprising pyrilium dye and polymeric material having an alkylidene diarylene moiety in the recurring unit; and said element being in the form of a multiphase heterogeneous composition comprising a continuous phase of the polymeric material having therein a discontinuous phase comprising the pyrilium dye present in an aggregated ordered form.

2. A nonlinear optical device as defined in claim 1, wherein the nonlinear optical element comprises polymeric material prepared from linear polymer having a recurring unit of the formula

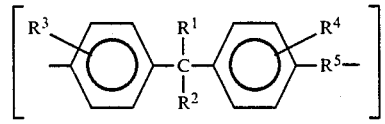

wherein
R[1] and R[2] are individually selected from the group consisting of H, substituted and unsubstituted alkyl radicals having 1 to 10 carbon atoms, and substituted and unsubstituted aryl radicals;
R[1] and R[2], taken in combination, are a cyclic hydrocarbon radical having a maximum of 18 carbon atoms;
R[3] and R[4] are individually selected from the group consisting of H, F, Cl, Br, I and alkyl radicals having 1 to 6 carbon atoms; and
R[5] is a divalent radical selected from the group consisting of

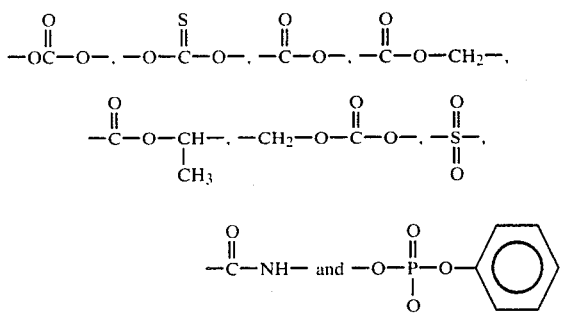

3. A nonlinear optical device as defined in claim 2, wherein $R^5$ is

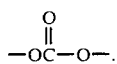

4. A nonlinear optical device as defined in claim 3, wherein the polymer is polycarbonate wherein $R^3$ and $R^4$ are H and $R^1$ and $R^2$ are methyl.

5. A nonlinear optical device as defined in claim 4, wherein the pyrilium dye is of the formula

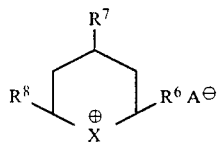

wherein $R^6$ and $R^8$, individually, are phenyl radicals or substituted phenyl radicals having at least one substituent selected from the group consisting of alkyl radicals having 1 to 6 carbon atoms and alkoxy radicals having 1 to 6 carbon atoms; $R^7$ is 4-dimethylaminophenyl; X is selected from the group consisting of NH, O, S, Se and Te; and A is an anion selected from the group consisting of perchlorate, fluoroborate, tetrafluoroborate, hexafluorophosphate, iodide, chloride, bromide, sulfate, periodate, and p-toluenesulfonate.

6. A nonlinear optical device as defined in claim 5, wherein X is S or Se.

7. A nonlinear optical device as defined in claim 6, wherein the multiphase heterogeneous composition contains pyrilium dye in an amount of from about 0.1 to about 10 weight percent based on the polymeric material.

8. A nonlinear optical device as defined in claim 7, wherin the multiphase heterogeneous composition contains pyrilium dye in an amount of from about 1 to about 4 weight percent based on the polymeric material.

9. A nonlinear optical device as defined in claim 6, wherein the multiphase heterogeneous composition contains an electron donor.

10. A nonlinear optical device as defined in claim 9, wherein the electron donor is selected from the group consisting of triarylmethane leuco dyes wherein the aryl groups are unsubstituted phenyl or phenyl substituted with such substituents as alkyl and alkoxy radicals having 1 to 8 carbon atoms, hydroxy and halogen and the amino substituent is a p-dialkylamino group, —$NL_2$, wherein L is an alkyl radical having 1 to 8 carbon atoms.

11. A method of generating second harmonic radiation, comprising illuminating a nonlinear optical element with coherent optical radiation, said nonlinear optical element comprising pyrilium dye and polymeric material having an alkylidene diarylene moiety in the recurring unit; and said element being in the form of a multiphase heterogeneous composition comprising a continuous phase of the polymeric material having therein a discontinuous phase comprising the pyrlium dye present in an aggregated ordered form.

12. A method of generating second harmonic radiation as defined in claim 11, wherein the polymeric material is prepared from linear polymer having a recurring unit of the formula

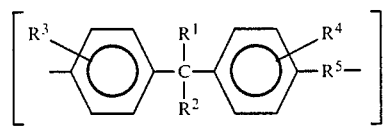

wherein,
$R^1$ and $R^2$ are individually selected from the group consisting of H, substituted and unsubstituted alkyl radicals having 1 to 10 carbon atoms, and substituted and unsubstituted aryl radicals;

$R^1$ and $R^2$, taken in combination, are a cyclic hydrocarbon radical having a maximum of 18 carbon atoms;

$R^3$ and $R^4$ are individually selected from the group consisting of H, F, Cl, Br, I and alkyl radicals having 1 to 6 carbon atoms; and $R^5$ is a divalent radical selected from the group consisting of

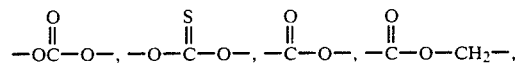

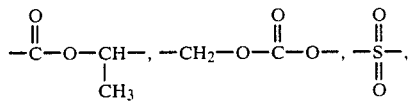

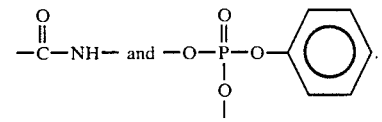

13. A method of generating second harmonic radiation as defined in claim 12, wherein $R^5$ is

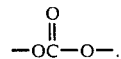

14. A method of generating second harmonic radiation as defined in claim 13, wherein the polymer is polycarbonate wherein $R^3$ and $R^4$ are H and $R^1$ and $R^2$ are methyl.

15. A method of generating second harmonic radiation as defined in claim 13, wherein the pyrlium dye is of the formula

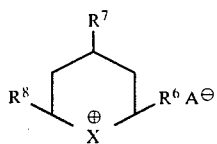

wherein $R^6$ and $R^8$, individually, are phenyl radicals or substituted phenyl radicals having at least one substituent selected from the group consisting of alkyl radicals having 1 to 6 carbon atoms and alkoxy radicals having from 1 to 6 carbon atoms; $R^7$ is 4-dimethylaminophenyl; X is selected from the group consisting of NH, O, S, Se, and Te; and A is an anion selected from the group consisting of perchlorate, fluoroborate, tetrafluoroborate, hexafluorophosphate, iodide, chloride, bromide, sulfate, periodate, and p-toluenesulfonate.

16. A method generating second harmonic radiation as defined in claim 15, wherein X is S or Se.

17. A method of generating second harmonic radiation as defined in claim 16, wherein the heterogeneous composition contains an electron donor.

18. A method of generating second harmonic radiation as defined in claim 17, wherein the electron donor is selected from the group consisting of triarylmethane leuco dyes wherein the aryl groups are unsubstituted phenyl or phenyl substituted with such substituents as alkyl and alkoxy radicals having 1 to 8 carbon atoms, hydroxy and halogen and the amino substituent is a p-dialkylamino group, —$N_2$, wherein L is an alkyl radical having 1 to 8 carbon atoms.

* * * * *